(12) United States Patent
Zhang et al.

(10) Patent No.: US 12,115,653 B2
(45) Date of Patent: Oct. 15, 2024

(54) SOFT JOINT GRIPPER BASED ON 4D PRINTING AND CONSISTENCY CONTROL METHOD THEREOF

(71) Applicant: YANSHAN UNIVERSITY, Qinhuangdao (CN)

(72) Inventors: Yuyan Zhang, Qinhuangdao (CN); Shiying Kou, Qinhuangdao (CN); Xiaoyuan Luo, Qinhuangdao (CN); Yintang Wen, Qinhuangdao (CN); Bo Liang, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 846 days.

(21) Appl. No.: 17/288,221

(22) PCT Filed: May 7, 2020

(86) PCT No.: PCT/CN2020/088863
§ 371 (c)(1),
(2) Date: Apr. 23, 2021

(87) PCT Pub. No.: WO2021/184505
PCT Pub. Date: Sep. 23, 2021

(65) Prior Publication Data
US 2022/0305668 A1   Sep. 29, 2022

(30) Foreign Application Priority Data
Mar. 20, 2020 (CN) .......................... 202010201908.4

(51) Int. Cl.
*B25J 15/00* (2006.01)
*B25J 9/16* (2006.01)
(Continued)

(52) U.S. Cl.
CPC ........ *B25J 15/0009* (2013.01); *B25J 9/1605* (2013.01); *B25J 15/10* (2013.01); *B25J 15/12* (2013.01)

(58) Field of Classification Search
CPC ...... B25J 15/0009; B25J 9/1605; B25J 15/10; B25J 15/12; B25J 19/007; B25J 9/1664;
(Continued)

(56) References Cited

U.S. PATENT DOCUMENTS 10,431,730 B2   10/2019   Chiba et al.
2010/0176615 A1* 7/2010   Okuda ................. A61F 2/583
                                                  901/31
(Continued)

FOREIGN PATENT DOCUMENTS

CN   104035337 A   *   9/2014
CN   106956283 A        7/2017
(Continued)

OTHER PUBLICATIONS

M. Pilz da Cunha, Y. Foelen, T. A. P. Engels, K. Papamichou, M. Hagenbeek, M. G. Debije, A. P. H. J. Schenning, Advanced Optical Materials 2019, 7, 1801604. https://doi.org/10.1002/adom.201801604 (Year: 2019).*
(Continued)

*Primary Examiner* — Adam R Mott
*Assistant Examiner* — Joseph Anthony Trias
(74) *Attorney, Agent, or Firm* — Thomas | Horstemeyer, LLP

(57) ABSTRACT

A soft joint gripper based on 4D printing comprises a palm body and five soft finger units connected with the palm body; each soft finger unit is provided with two soft finger joints and two finger bones; the finger bones are made of 3D printing resin; the soft finger joints are two symmetrical double-layer thin-film soft finger joint actuators; the double-
(Continued)

layer thin-film soft finger joint actuator is made of a 4D printing liquid crystal elastomer and a polyimide electrothermal film, and the bending angle of each double-layer thin-film soft finger joint actuator is changed by energization or heating stimulation; and the double-layer film soft finger joint actuator is used to control the soft finger unit to perform reversible bending motion. Accurate control of the soft joint gripper can be realized.

16 Claims, 5 Drawing Sheets

(51) Int. Cl.
*B25J 15/10* (2006.01)
*B25J 15/12* (2006.01)

(58) Field of Classification Search
CPC . B33Y 80/00; B06B 1/0603; B81B 2201/032; B81B 3/0024; G11B 5/592; G10H 2220/555
USPC .......................................................... 700/245
See application file for complete search history.

(56) References Cited

U.S. PATENT DOCUMENTS

| | | | |
|---|---|---|---|
| 2013/0285404 A1* | 10/2013 | Lin | ...................... B25J 15/0009 |
| | | | 901/30 |
| 2017/0155032 A1 | 6/2017 | Chiba et al. | |

FOREIGN PATENT DOCUMENTS

| | | | | |
|---|---|---|---|---|
| CN | 107081777 A | | 8/2017 | |
| CN | 108466276 A | | 8/2018 | |
| CN | 109249415 A | * | 1/2019 | ............ B25J 13/081 |
| CN | 109848957 A | | 6/2019 | |
| CN | 110509301 A | | 11/2019 | |
| JP | 2017099429 A | | 6/2017 | |

OTHER PUBLICATIONS

J. Shintake, V. Cacucciolo, D. Floreano, H. Shea, Adv. Mater. 2018, 30, 1707035. https://doi.org/10.1002/adma.201707035 (Year: 2018).*
"International Search Report related to PCT/CN2020/088863, mailing date May 7, 2020, 5 pages" (In Chinese Only).

* cited by examiner

//www.w3.org/1999/xhtml">
SOFT JOINT GRIPPER BASED ON 4D PRINTING AND CONSISTENCY CONTROL METHOD THEREOF This application is a 35 U.S.C. § 371 national stage application of PCT International Application No. PCT/CN2020/088863, filed on May 7, 2020, which claims the priority of the Chinese patent application filed in China National Intellectual Property Administration on Mar. 20, 2020, with the Application NO. 202010201908.4 and entitled as "soft joint gripper based on 4D printing and consistency control method thereof", with the entire contents of each above-identified application incorporated in this application by reference.

TECHNICAL FIELD

The present disclosure relates to the technical field of soft robot control, in particular to a soft joint gripper based on 4D printing and a consistency control method thereof.

BACKGROUND

Traditional manipulators and pneumatic manipulators are all consisted of complex component structures, which have large weight, volume and energy consumption. Soft robots are superior to traditional rigid robots in adaptability, light weight and flexibility, and can change its shape and size at will in a wide range, thus expanding the research field of robots.

Soft robot technology was pneumatic drive technology at the beginning. With the development of science and technology, intelligent materials and structures have been gradually applied to many research fields. At present, intelligent material driving technology is a brand-new research direction in soft robots, which belongs to the connotation of 4D printing technology concept. 4D printing technology is a disruptive manufacturing technology that actively controls the deformation, denaturation and function change of intelligent material components in the dimension of time and space through the active design of materials or structures. Intelligent materials using 4D printing technology are applied to a robot soft joint gripper, which has intelligent deformation behaviors such as sensing, driving and controlling. Through precise design of intelligent materials, intelligent materials can be actively regulated and controlled under the stimulation of external environment, ensuring that its actuator can be deformed as expected. However, due to the multiple degrees of freedom in the process of self-assembly and self-deformation, it is difficult to control. Therefore, the consistent self-deformation driving of 4D printing soft joint gripper is a brand-new design way to realize accurate control of shape, function and performance at the same time.

Consistency control has been applied to a mechanical arm system, and the consistency problem is mainly to control a group of multi-agents with different initial states through a consistency control protocol, so that the position and the velocity of a multi-agent system converge to a constant value, while multiple soft finger units in 4D printing soft joint gripper control can be regarded as a multi-agent system, which accords with the basic characteristics of a multi-agent system.

After searching the existing patents, in the Chinese patent Application NO. CN107139207A, which is entitled as Pneumatic Soft Finger, Soft Finger Control System And Control Method Thereof, the method discloses a pneumatic soft finger, a soft finger control system and a control method thereof The soft finger comprises an air cavity driving and sensing part, so as to measure the bending angle of the finger to realize closed-loop control of the finger. However, the control system of the present disclosure is complex and does not use an accurate control algorithm. Compared with 4D printing intelligent driving materials, pneumatic driving has no advantages in weight and volume. In the Chinese patent Application NO. CN110340933, which is entitled as Intelligent Bionic Grasping And Clamping Device Modelled Based On 4d Printing, the present disclosure discloses an intelligent bionic grasping and clamping device modelled based on 4D printing. The intelligent bionic grasping and clamping device is obtained by 4D printing technology, and the bending degree is controlled by a temperature adjusting mechanism. However, the present disclosure has no device for detecting and transmitting information, and can only realize simple bending behavior. Moreover, a single bending and clamping device has infinite degrees of freedom and does not realize accurate control.

SUMMARY

The purpose of the present disclosure is to provide a soft joint gripper based on 4D printing and a consistency control method thereof, which fills the blank of an intelligent bionic grasping and clamping device modelled by 4D printing liquid crystal elastomer materials, and embeds a device for detecting and transmitting information. In the past, the 4D printing and clamping device can only realize simple bending behavior, has infinite degrees of freedom, and does not realize accurate control. Therefore, the present disclosure establishes a kinematic model and adds a consistency control algorithm, so that the 4D printing soft joint gripper can achieve controllable consistent bending.

In order to achieve the above purpose, the technical scheme of the present disclosure is as follows: a soft joint gripper based on 4D printing, comprising: a palm body and five soft finger units connected to the palm body, wherein;

each soft finger unit is provided with two soft finger joints and two finger bones; the finger bones are made of 3D printing resin; the soft finger joints are two symmetrical double-layer thin-film soft finger joint actuators; the double-layer thin-film soft finger joint actuator is made of a 4D printed liquid crystal elastomer and a polyimide electrothermal film, and the bending angle of each double-layer thin-film soft finger joint actuator is changed by energization or heating stimulation; and the double-layer film soft finger joint actuator is used to control the soft finger unit to perform reversible bending motion.

Preferably, a bending sensor is attached to the surface of the double-layer film soft joint actuator.

Preferably, the polyimide electrothermal film is used to adjust the temperature of the double-layer thin-film soft joint actuator; the polyimide electrothermal film generates Joule heat, the temperature rises, the liquid crystal elastomer shrinks, the polyimide electrothermal film expands, the contraction and expansion of different layers result in the bending of the soft finger joint; the double-layer thin-film soft finger joint actuator bends to the contraction side, and when the temperature drops and recovers to its original state, the reversible bending motion of the soft finger unit is controlled.

Preferably, the bending angles of the double-layer film soft joint actuators are the same; and the bending directions of the two double-layer thin-film soft finger joint actuators with symmetrical soft finger joints are opposite.

A consistency control method of a soft joint gripper based on 4D printing is provided, the consistency control method of a soft joint gripper based on 4D printing comprising:

acquiring the bending angle of the soft finger joint and the rotation angle of the finger bone;

establishing a soft finger joint dynamic model and a finger bone dynamic model according to the bending angle of the soft finger joint and the rotation angle of the finger bone, respectively;

under a local coordinate system, determining the soft finger joint centroid positions and the soft finger joint centroid velocities of any two soft finger joints according to the soft finger joint dynamic model;

under a global coordinate system, determining the finger bone centroid positions and the finger bone centroid velocities of any two finger bones according to the finger bone dynamic model;

determining the soft finger joint kinetic energy and the soft finger joint potential energy according to the soft finger joint centroid position and the soft finger joint centroid velocity;

determining the finger bone kinetic energy and the finger bone potential energy according to the finger bone centroid position and the finger bone centroid velocity;

determining the dynamic model of bending angles of five soft finger units with respect to the soft finger joints according to the soft finger joint kinetic energy and the soft finger joint potential energy;

taking the dynamic model of bending angles of five soft finger units with respect to the soft finger joints as a control target to determine a consistency control protocol of a soft finger unit;

controlling the soft finger unit to perform reversible bending motion according to the consistency control protocol of the soft finger unit.

Preferably, determining the soft finger joint centroid positions and the soft finger joint centroid velocities of any two soft finger joints according to the soft finger joint dynamic model under a local coordinate system specifically comprises:

determining the soft finger joint centroid positions of any two soft finger joints according to the formula $V_{hi}(s) = R_{(i-1)}\gamma_i(s) + V_{h(i-1)}(s)$; where $V_{hi}(s)$ is the soft finger joint centroid position;

$$R_i = \begin{bmatrix} \cos\theta_i & -\sin\theta_i \\ \sin\theta_i & \cos\theta_i \end{bmatrix}$$

is the coordinate transformation matrix;

$$\gamma_i(s) = \begin{bmatrix} \dfrac{I_l}{2} + \dfrac{I_h}{\theta_i \sin(\theta_i s / I_h)} \\ \dfrac{I_h}{\theta_i(1 - \cos(\theta_i s / I_h))} \end{bmatrix},$$

$I_l$ is the length of the finger bone, and $I_h$ is the length of the soft finger joint; $\theta_i$ a is the bending angle of the soft finger joint, i=1, 2, 3, 4, 5;

$$\dfrac{\theta_i s}{I_h}$$

is the central angle corresponding to the segment (0~s) which derives the bending angle of the soft finger joint and determines the soft finger joint centroid velocity.

Preferably, determining the finger bone centroid positions and the finger bone centroid velocities of any two finger bones according to the finger bone dynamic model under a global coordinate system specifically comprises:

determining the finger bone centroid positions of any two finger bones according to the formula $$V_{l1} = \begin{bmatrix} x_{l1} \\ y_{l1} \end{bmatrix} = \begin{bmatrix} \varphi_1 + \left(\varphi_1 + \dfrac{I_l}{2}\right)\cos q_1 \\ \left(\varphi_1 + \dfrac{I_l}{2}\right)\sin q_1 \end{bmatrix} \text{ and}$$

$$V_{l2} = \begin{bmatrix} x_{l2} \\ y_{l2} \end{bmatrix} = \begin{bmatrix} \varphi_1 + (\varphi_1 + I_i + \varphi_2)\cos q_1 + \left(\varphi_2 + \dfrac{I_l}{2}\right)\cos q_2 \\ (\varphi_1 + I_i + \varphi_2)\sin q_1 + \left(\varphi_2 + \dfrac{I_l}{2}\right)\sin q_2 \end{bmatrix};$$

where $V_{l1}$ is the finger bone centroid position of any finger bone; $V_{l2}$ is the finger bone centroid position of the finger bone adjacent to any finger bone;

$$\varphi_i = \left(r_i + \dfrac{T}{2}\right)\tan\dfrac{\theta_i}{2}; \; r_i = I_{li}\dfrac{\sin\theta_i}{\theta_i}$$

is the bending radius; T is the thickness of the soft finger joints; $q_1$ is the rotation angle of any finger bone; $q_2$ is the rotation angle of the adjacent finger bones;

deriving the rotation angle of the finger bone to determine the finger bone centroid velocity.

Preferably, determining the dynamic model of bending angles of five soft finger units with respect to the soft finger joints according to the soft finger joint kinetic energy and the soft finger joint potential energy specifically comprises:

determining the dynamic model of bending angles of five soft finger units with respect to the soft finger joints according to the formula $M(\theta_i)\ddot{\theta}_i + C(\theta_i, \dot{\theta}_i)\dot{\theta}_i + g(\theta_i) = \tau_i$; where $C(\theta_i, \dot{\theta}_i)\dot{\theta}_i$ is a symmetric inertia matrix; $M(\theta_i)\ddot{\theta}_i$ is Coriolis moment; $g(\theta_i)$ is a generalized powerful moment; $\tau_i$ is the dynamic model of bending angles of five soft finger units with respect to the soft finger joints, $\tau_i$ represents the input amount or control torque generated by each soft finger unit; $\dot{\theta}_i$ is the angular velocity of the bending angle of the soft finger joint; $\ddot{\theta}_i$ is the acceleration of the bending angle of the soft finger joint.

Preferably, taking the dynamic model of bending angles of five soft finger units with respect to the soft finger joints as a control target to determine a consistency control protocol of a soft finger unit specifically comprises:

determining the consistency control protocol of the soft finger unit according to the formula $$\tau_i = -\sum_{j=1}^{n} a_{ij}(\theta_i - \theta_j) - \dot{\theta}_i,$$

where $a_{ij}$ is the number of the ith row and the jth column in the Laplace matrix corresponding to the location communication topological graph.

According to the specific embodiment according to the present disclosure, the present disclosure has disclosed the following technical effects: the present disclosure provides a soft joint gripper based on 4D printing and a consistency control method thereof The double-layer thin-film soft finger joint actuator of 4D printing intelligent composite material is used as a soft finger joint matrix, and integrated 3D printing models a soft joint gripper, wherein the soft finger joint is regarded as a degree of freedom, which overcomes the defect that the double-layer thin-film soft finger joint actuator has too high degree of freedom. The bent soft fingers are modeled, the dynamic model of a 4D printing soft joint gripper is established, and the consistency control protocol is determined, so that the soft joint gripper can coordinate with each other according to the rules, and finally the position of each soft finger is consistent, realizing the expected self-assembly and self-deformation of 4D printing intelligent materials. Collaborative action improves the intelligence and operability of the system, and the precise grasping and cooperative operation of the soft hand will become the future development direction.

BRIEF DESCRIPTION OF THE DRAWINGS

The present disclosure will be further explained with reference to the accompanying drawings.

DETAILED DESCRIPTION

The technical scheme in the embodiments of the present disclosure will be described clearly and completely hereinafter with reference to the drawings in the embodiments of the present disclosure. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The purpose of the present disclosure is to provide a soft joint gripper based on 4D printing and a consistency control method thereof, which can realize accurate control of the soft joint gripper.

In order to make the above objects, features and advantages of the present disclosure more obvious and understandable, the present disclosure will be further explained in detail with reference to the drawings and specific embodiments.

Figure 1:
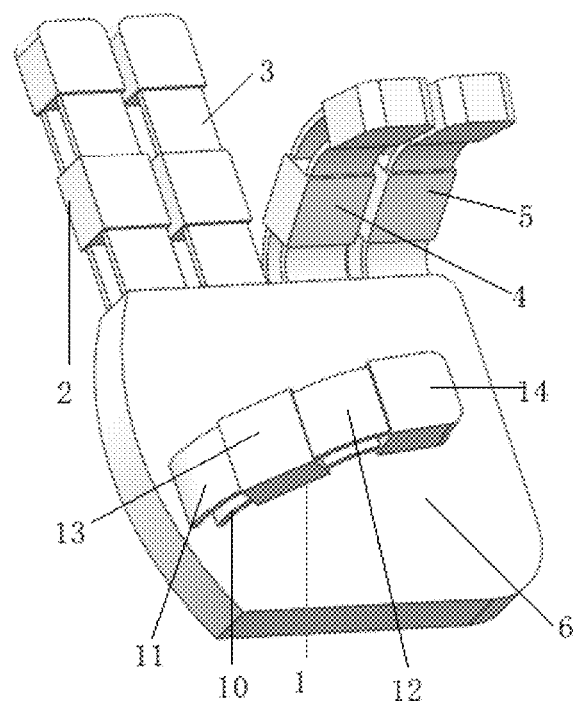
FIG. 1 is a perspective diagram of a 4D printing soft joint hand according to the present disclosure.
Figure 2:
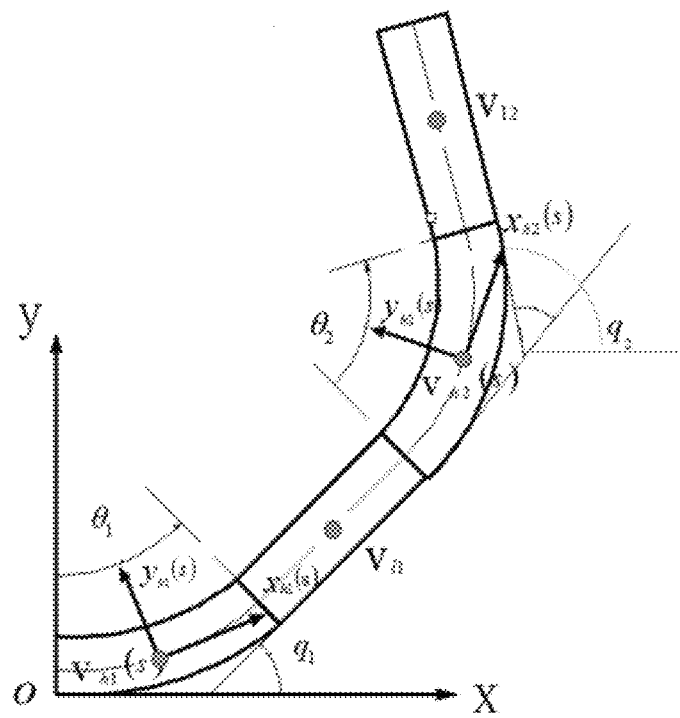
FIG. 2 is a schematic structural diagram of a single finger unit model according to the present disclosure.

FIG. 1 is a soft joint gripper based on 4D printing according to the present disclosure. As shown in FIG. 1, the soft joint gripper based on 4D printing consists of five soft finger units, namely a first soft finger unit 1, a second soft finger unit 2, a third soft finger unit 3, a fourth soft finger unit 4, a fifth soft finger unit 5, and a palm body 6. The first soft finger unit is provided with two soft finger joints, namely a first soft finger joint 11 and a second soft finger joint 12, and two finger bones, namely a first finger bone 13 and a second finger bone 14. As shown in FIGS. 2, $\theta_1$ and $\theta_2$ are bending angles corresponding to two soft finger joints, respectively. $q_1$ and $q_2$ are rotation angles corresponding to finger bones, respectively.

Figure 3:
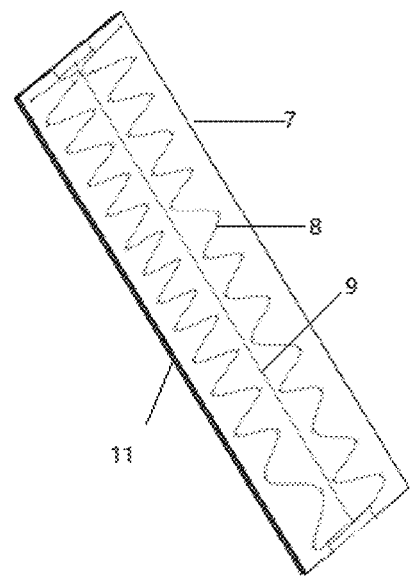
FIG. 3 is a schematic structural diagram of a double-layer film bending actuator of a 4D printing liquid crystal elastomer and a polyimide electrothermal film according to the present disclosure.
Figure 4:
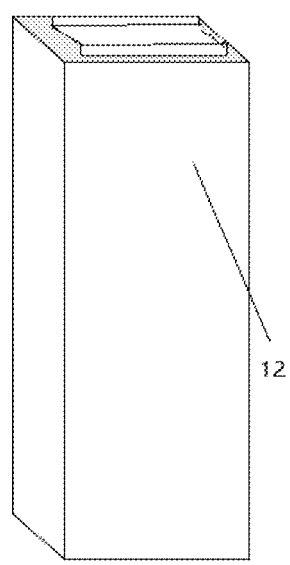
FIG. 4 is a schematic structural diagram of a 3D printing resin according to the present disclosure.

As shown in FIG. 3 to FIG. 4, the soft finger joint consists of a double-layer thin-film soft finger joint actuator made of a double-layer thin-film structure of a 4D printing liquid crystal elastomer and a polyimide electrothermal film. The polyimide electrothermal film 8 is attached to the surface of each layer of liquid crystal elastomers 7, and a bending angle detection sensor 9 is attached to the surface. During energization or heating, the soft finger joints bend. The finger bones are made of 3D printing resin lightweight hard materials. The finger bone and the soft finger joint are connected in parallel and do not deform themselves. With the bending of a soft finger joint, the palm body serves as the base. The humanoid hand soft joint gripper can flexibly rotate and bend with multiple degrees of freedom, which is convenient for grasping objects and realizes bending similar to that of "human hands".

According to the present disclosure, a double-layer thin-film soft finger joint actuator is manufactured by using a double-layer thin-film structure of a 4D printing liquid crystal elastomer and a polyimide electrothermal film. The thermally responsive liquid crystal elastomer is a polymer which can shrink and deform under the stimulation of temperature, and the expansion and contraction of different layers after being heated result in a larger bending angle. A bending angle detection sensor is attached to the double-layer thin-film soft finger joint actuator. Joule heat generated by a polyimide electrothermal film changes the temperature of the double-layer thin-film soft finger joint actuator and then controls the bending amount. The nonlinear function is used to fit the response characteristics of the double-layer thin-film soft finger joint actuator.

According to the present disclosure, the soft finger joint in the soft finger joint hand consists of two symmetrical double-layer thin-film soft finger joint actuators, which are similar to artificial muscles and can realize reverse bending. In order to verify the motion ability of the soft joint hand, each soft finger joint is regarded as a degree of freedom. The soft finger joint and the finger bone are modeled in different coordinate systems, respectively, and the dynamic model is established by Euler-Lagrange equation. According to the dynamic model, the consistency control protocol is determined, so that the final position of each soft finger unit is consistent.

Each soft finger unit can be regarded as an independent agent, which is mainly aimed at the static position consistency problem of the soft joint hand system with independent models under the undirected topology. The final position of a group of soft finger units with different initial states is controlled to converge to a constant value. The simulation proves that the soft hand reaches the position consistency state. Finally, the consistency evaluation is carried out, and the soft joint hand is controlled to achieve the position consistency through the control input signal given by the simulation.

The orientation of a liquid crystal matrix is programmed in the printing process of liquid crystal elastomer, and then is crosslinked by ultraviolet irradiation. After heating, the expansion and contraction of different layers cause the actuator to bend. A bending curvature detection sensor is attached to the surface of the double-layer thin-film soft finger joint actuator, and the bending angle of each soft finger joint can be changed by energization or heating stimulation. Two symmetrical double-layer film soft finger joint actuators of the soft finger joint have opposite bending directions, so that the reversible bending motion of the finger unit is realized. Finger bones are made of lightweight and fixed materials with high hardness. With the bending of a soft finger joint, the bending of each soft finger joint can be regarded as having one degree of freedom, and each finger unit has two degrees of freedom. When the soft finger joint is energized from the outside, the liquid crystal elastomer shrinks and the polyimide polymer expands due to the increase of temperature. The bending unit will bend to the contracted side. When the energization is stopped, the bending unit will slowly recover to its original state.

Figure 5:
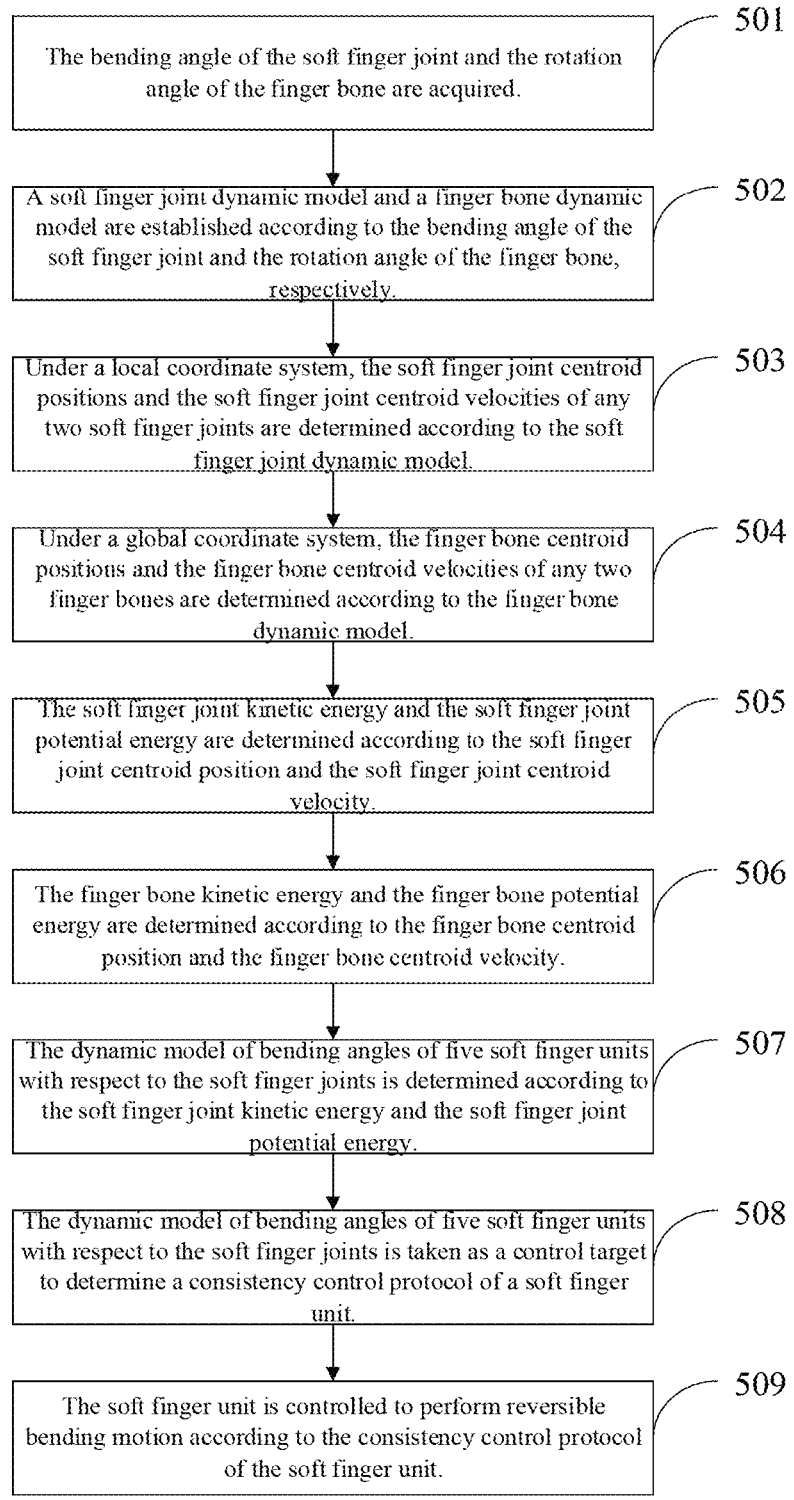
FIG. 5 is a flowchart of a consistency control method of a soft joint gripper based on 4D printing according to the present disclosure.

FIG. 5 is a flowchart of the consistency control method of a soft joint gripper based on 4D printing according to the present disclosure. As shown in FIG. 5, a consistency control method of a soft joint gripper based on 4D printing comprises the following steps.

Step 501: the bending angle of the soft finger joint and the rotation angle of the finger bone are acquired.

Prior to step 501, the method further comprises: changing the bending angle of each soft finger joint by energizing the polyimide electrothermal film, measuring the bending angle and the value of the bending normal stress corresponding to the temperature at each moment according to the bending angle detection device, and applying the nonlinear least square fitting function to obtain the relationship equation between the bending normal stress and the bending angle corresponding to the temperature, and further controlling the position and velocity of each finger bone.

The first soft finger unit is taken as an example. According to the measured bending angle of the soft finger joint, the dynamic models of a finger bone and a bent soft finger joint are established, respectively; $\theta_i$, $\dot{\theta}_i$(i+1, 2) is the bending angle and the angular velocity of the ith soft finger joint, $q_i$, $\dot{q}_i$(i+1, 2) is the rotation angle and the angular velocity of the ith finger bone, and the bending angle relationship therebetween is $$q_i = \sum_1^i \theta_i$$

and $$\dot{q}_i = \sum_1^i \dot{\theta}_i.$$

Step 502: a soft finger joint dynamic model and a finger bone dynamic model are established according to the bending angle of the soft finger joint and the rotation angle of the finger bone, respectively.

Step 503: under a local coordinate system, the soft finger joint centroid positions and the soft finger joint centroid velocities of any two soft finger joints are determined according to the soft finger joint dynamic model.

Because the soft finger joint bends, it is necessary to obtain the bending radius $r_i$ by virtue of the bending angle, and then determine the position coordinates of the two finger bones by using the length $I_h$ of the soft finger joint and the length $I_l$ of the finger bone under a global coordinate xoy. Then, the position coordinate of the soft finger joint is determined under a local coordinate $x_{hi}(s)oy_{hi}(s)$, where the horizontal axis under a local coordinate is the tangent line at a certain point $s \in (0 \sim I_h)$ on the soft finger joint. Finally, the position coordinate of the soft finger joint is transformed into a global coordinate by virtue of a coordinate transformation matrix.

The centroid position of two soft finger joints can be expressed as:

$$V_{hi}(s) = R_{(i-1)}\gamma_i(s) + V_{h(i-1)}(s)$$

where, $$\varphi_i = \left(r_i + \frac{T}{2}\right)\tan\frac{\theta_i}{2},$$

$$r_i = I_h \frac{\sin\theta_i}{\theta_i}$$

is the bending radius,

T is the thickness of the soft finger joint, $$R_i = \begin{bmatrix} \cos\theta_i & -\sin\theta_i \\ \sin\theta_i & \cos\theta_i \end{bmatrix}$$

is the coordinate transformation matrix, $$\gamma_i(s) = \begin{bmatrix} \frac{I_l}{2} + \frac{I_h}{\theta_i \sin(\theta_i s / I_h)} \\ \frac{I_h}{\theta_i(1 - \cos(\theta_i s / I_h))} \end{bmatrix}$$

is obtained according to the position geometric relationship, and $I_l$ is the length of the finger bone. The centroid velocity can be obtained by deriving $\theta_i$.

Step 504: under a global coordinate system, the finger bone centroid positions and the finger bone centroid velocities of any two finger bones are determined according to the finger bone dynamic model.

The centroid position of two finger bones can be expressed as:

$$V_{l1} = \begin{bmatrix} x_{l1} \\ y_{l1} \end{bmatrix} = \begin{bmatrix} \varphi_1 + \left(\varphi_1 + \frac{I_l}{2}\right)\cos q_1 \\ \left(\varphi_1 + \frac{I_l}{2}\right)\sin q_1 \end{bmatrix}$$

$$V_{l2} = \begin{bmatrix} x_{l2} \\ y_{l2} \end{bmatrix} = \begin{bmatrix} \varphi_1 + (\varphi_1 + I_i + \varphi_2)\cos q_1 + \left(\varphi_2 + \frac{I_l}{2}\right)\cos q_2 \\ (\varphi_1 + I_i + \varphi_2)\sin q_1 + \left(\varphi_2 + \frac{I_l}{2}\right)\sin q_2 \end{bmatrix}$$

Step 505: the soft finger joint kinetic energy and the soft finger joint potential energy are determined according to the soft finger joint centroid position and the soft finger joint centroid velocity.

The kinetic energy $k_{hi}$ and potential energy $u_{hi}$ of a soft finger joint are:

$$k_{hi}(s) = \frac{1}{2I_h} m_h \|\dot{V}_{hi}(s)\|^2 + \frac{1}{24I_h} \dot{\theta}_i^2(s)$$

$$u_{hi}(s) = -\frac{m_h g V_{hi}(s)}{I_h}$$

where J is the moment of inertia of each finger bone, g is the acceleration constant of gravity, and $m_l$ and $m_h$ are the mass of a finger bone and a soft finger joint, respectively.

Step 506: the finger bone kinetic energy and the finger bone potential energy are determined according to the finger bone centroid position and the finger bone centroid velocity.

The kinetic energy $k_{li}$ and potential energy $u_{li}$ of a finger bone are:

$$k_{hi} = 1/2\ ml\|\dot{V}\|^2 + 1/2 j \dot{q}_i^2$$

$$u_{li} = -m_l g V_{li}$$

Step 507: the dynamic model of bending angles of five soft finger units with respect to the soft finger joints is determined according to the soft finger joint kinetic energy and the soft finger joint potential energy.

$s \in (0 \sim I_h)$ is a certain point bent on the soft finger joint. According to the centroid position and centroid velocity obtained in step 2, the kinetic energy $k_{li}$ and potential energy $u_{li}$ of the soft finger joint can be obtained. Lagrange function is the difference between all kinetic energy and all potential energy of two finger bones and two soft finger joints, which is expressed as:

$$L = \sum_{i=1}^{2} \left[ (k_{li} - u_{li}) + \int_0^{I_h} (k_{hi}(s) - u_{hi}(s)) ds \right]$$

Euler-Lagrange dynamic equation is then established, and the Euler-Lagrange dynamic equation of each soft finger in the system is expressed as:

$$\frac{d}{dt}\left[\frac{\partial L}{\partial \dot{\theta}_i}\right] - \left[\frac{\partial L}{\partial \theta_i}\right] = \tau_i, i = 1, 2$$

Furthermore, according to the angle relationship between the finger bone and the soft finger joint and Euler-Lagrange dynamic equation, the dynamic model of the angle θ of five soft finger units with respect to the soft finger joint is obtained:

$$M(\theta_i)\ddot{\theta}_i + C(\theta_i, \dot{\theta}_i)\dot{\theta}_i + g(\theta_i) = \tau_i, i=1,2,3,4,5$$

where $C(\theta_i, \dot{\theta}_i)\dot{\theta}_i$ represents a symmetric inertia matrix, $M(\theta_i)\ddot{\theta}_i$ represents Coriolis moment, $g(\theta_i)$ represents a generalized force moment, and $\tau_i$ represents the input amount or control torque generated by each soft finger unit.

Step 508: the dynamic model of bending angles of five soft finger units with respect to the soft finger joints is taken as a control target to determine a consistency control protocol of a soft finger unit.

Figure 6:
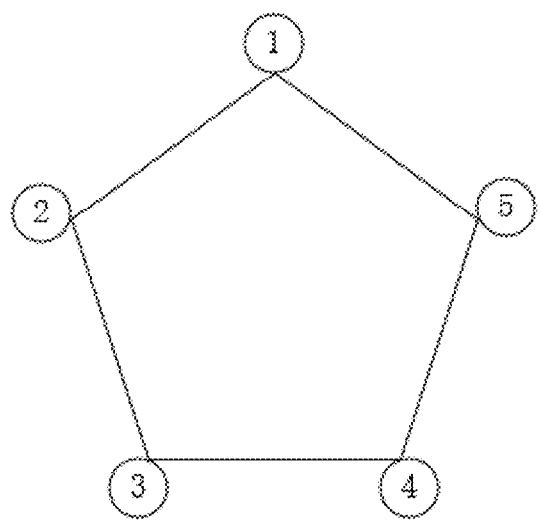
FIG. 6 is a position topological structure diagram of five soft fingers according to the present disclosure.

As shown in FIG. 6, taking the obtained dynamic model of the soft joint hand as the control target, and taking the position consistency of the system into account, the position consistency control protocol is designed by using the position information of adjacent soft fingers and their own velocity information, and the position communication topological graph is used to represent the communication direction of sensing information between soft fingers that changes with time. The consistency control protocol aims at the position consistency problem of a soft joint hand system with the same models independent of each other, and controls a group of soft finger joints with different initial States, that is, different initial bending and stimulation. It is adjusted by feedback of position information between soft fingers. That is, when t→∞, each soft finger reaches the same position and the static state in which the velocity is 0, the cooperative self-bending and self-deformation design of a soft joint hand is realized. The consistency control protocol is as follows:

$$\tau_i = -\sum_{j=1}^{n} a_{ij}(\theta_i - \theta_j) - \dot{\theta}_i, i = 1, 2, 3, 4, 5$$

where, $\tau_i$ refers to the bending moment of the ith soft finger unit, and $a_{ij}$ is the number of edges connecting nodes i and j in the position communication topological graph. According to the control protocol, the input size of each soft finger joint in the process of finally reaching the same position can be obtained. Then, according to the fitting function equation of the bending normal stress and the bending angle corresponding to the temperature, a further control is carried out so that the final position is consistent.

Step 509: the soft finger unit is controlled to perform reversible bending motion according to the consistency control protocol of the soft finger unit.

Figure 7:
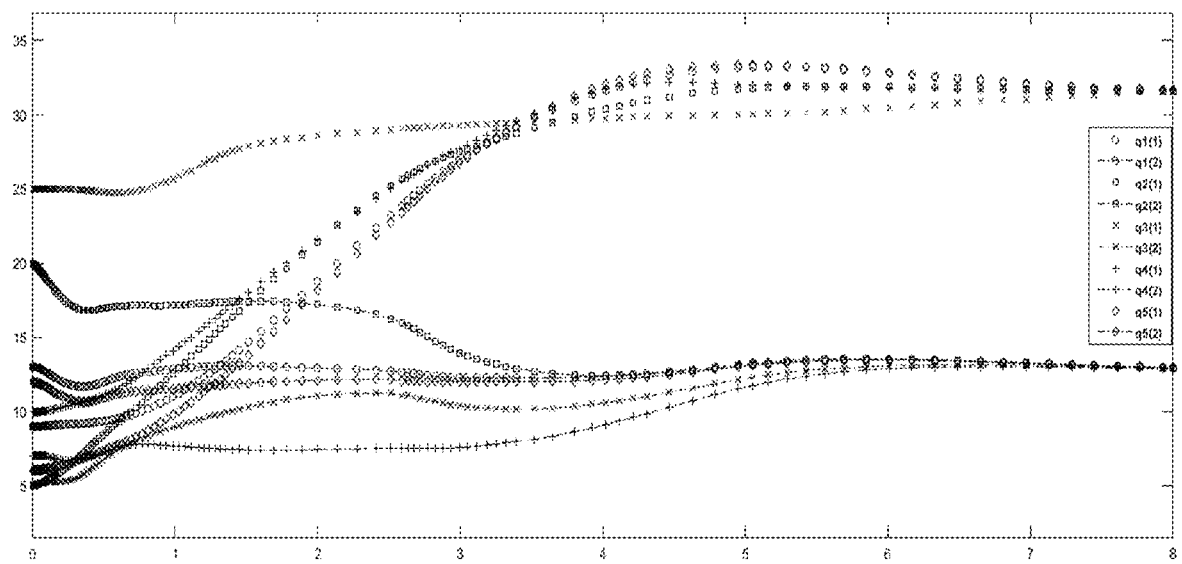
FIG. 7 is a graph showing the change of the bending angles of five soft fingers according to the present disclosure.
Figure 8:
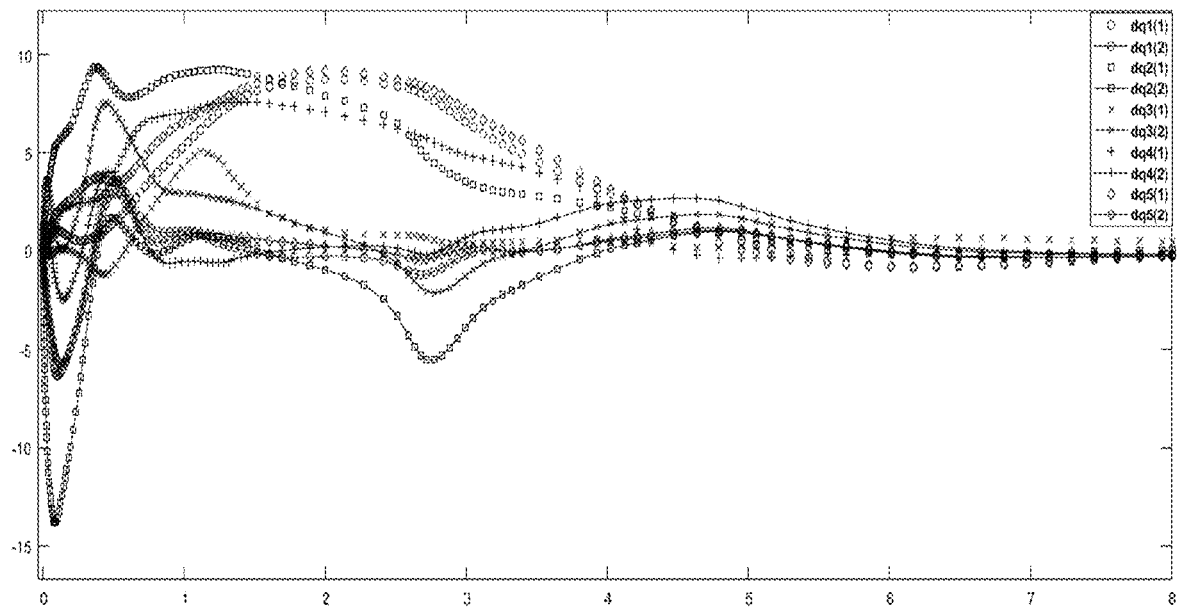
FIG. 8 is a graph showing the change of the bending angular velocities of five soft fingers according to the present disclosure.
Figure 9:
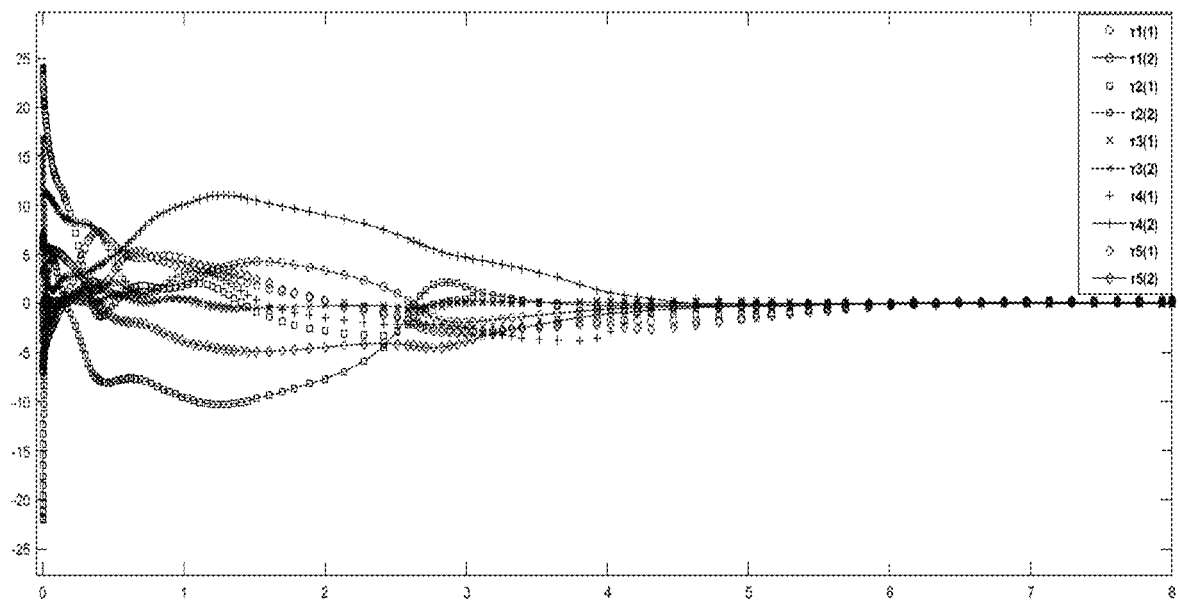
FIG. 9 is a graph showing the change of the bending control torque of five soft fingers according to the present disclosure.

As shown in FIGS. 7-9, the feasibility of the consistency control of a 4D printing soft joint hand is verified by specific simulation experiments, and the control algorithm is applied to the planar soft joint hand system, which contains five soft fingers with the same physical parameters and different initial state quantities.

As shown in FIG. 7, at about 8 s, the first joint of five soft joint hands reaches the bending angle of about 32 degrees, and the second joint reaches the bending angle of about 12 degrees, as shown in FIG. 8. The final angular velocity tends to the expected 0 m/s, and the input torque is shown in FIG. 9. Therefore, the soft hand can be controlled to achieve consistent bending according to the relationship equation of torque and bending control quantity. The results show that the soft joint hand acts in coordination with each other according to the rules, and finally the position of each soft finger is consistent, thus realizing the expected self-assembly and self-deformation of 4D printing intelligent materials, and verifying the validity of the consistency control method of a soft joint hand.

The present disclosure has a reasonable structure, and models soft finger joints and finger bones, respectively. The idea of consistency control is added. By collecting and transmitting sensing information, a group of soft joint hands with different initial states are cooperatively controlled to achieve their expected self-assembly and self-deformation, that is, the same position. Compared with the previous soft hand, the present disclosure overcomes the problems of modeling and control difficulties, realizes the self-sensing and self-driving cooperative consistent action of the 4D printing soft joint hand, and innovatively applies the consistent control theory to the self-driving of the 4D printing intelligent material structure.

In this specification, each embodiment is described in a progressive manner, and each embodiment focuses on the differences from other embodiments. It is sufficient to refer to the same and similar parts between various embodiments.

The above embodiments are provided only for the purpose of describing the present disclosure, rather than limit the scope of the present disclosure. The scope of the present disclosure is defined by the appended claims. All equivalent substitutions and modifications made without departing from the spirit and principle of the present disclosure shall be covered within the scope of the present disclosure.

What is claimed is:

1. A consistency control method of a soft joint gripper based on 4D printing, wherein the consistency control method of a soft joint gripper based on 4D printing is applied to a soft joint gripper based on 4D printing, wherein the soft joint gripper based on 4D printing, comprising:
   a palm body and five soft finger units connected to the palm body, wherein:
      each soft finger unit is provided with two soft finger joints and two finger bones;
      the finger bones are made of 3D printing resin;
      the soft finger joints are two symmetrical double-layer thin-film soft finger joint actuators;
      the double-layer thin-film soft finger joint actuators are made of a 4D printing liquid crystal elastomer and a polyimide electrothermal film, and the bending angle of each double-layer thin-film soft finger joint actuator is changed by energization or heating stimulation; and
   at least one double-layer film soft finger joint actuator is used to control the corresponding soft finger unit to perform reversible bending motion;
   and the consistency control method of a soft joint gripper based on 4D printing comprises:
   acquiring the bending angle of the soft finger joint and the rotation angle of the finger bone;
   establishing a soft finger joint dynamic model and a finger bone dynamic model according to the bending angle of the soft finger joint and the rotation angle of the finger bone, respectively;
   under a local coordinate system, determining the soft finger joint centroid positions and the soft finger joint centroid velocities of any two soft finger joints according to the soft finger joint dynamic model;
   under a global coordinate system, determining the finger bone centroid positions and the finger bone centroid velocities of any two finger bones according to the finger bone dynamic model;
   determining the soft finger joint kinetic energy and the soft finger joint potential energy according to the soft finger joint centroid position and the soft finger joint centroid velocity;
   determining the finger bone kinetic energy and the finger bone potential energy according to the finger bone centroid position and the finger bone centroid velocity;
   determining the dynamic model of bending angles of five soft finger units with respect to the soft finger joints according to the soft finger joint kinetic energy and the soft finger joint potential energy;
   taking the dynamic model of bending angles of five soft finger units with respect to the soft finger joints as a control target to determine a consistency control protocol of a soft finger unit; and
   controlling the soft finger unit to perform reversible bending motion according to the consistency control protocol of the soft finger unit.

2. The consistency control method of a soft joint gripper based on 4D printing according to claim 1, wherein determining the soft finger joint centroid positions and the soft finger joint centroid velocities of any two soft finger joints according to the soft finger joint dynamic model under a local coordinate system specifically comprises:
   determining the soft finger joint centroid positions of any two soft finger joints according to the formula $V_{hi}(s) = R_{(i-1)}\gamma_i(s) + V_{h(i-1)}(s)$;

where:
   $V_{hi}(s)$ is the soft finger joint centroid position;

$$R_i = \begin{bmatrix} \cos\theta_i & -\sin\theta_i \\ \sin\theta_i & \cos\theta_i \end{bmatrix}$$

is the coordinate transformation matrix;

$$\gamma_i(s) = \begin{bmatrix} \dfrac{I_l}{2} + \dfrac{I_h}{\theta_i \sin(\theta_i s / I_h)} \\ \dfrac{I_h}{\theta_i(1 - \cos(\theta_i s / I_h))} \end{bmatrix},$$

$I_l$ is the length of the finger bone, and $I_h$ is the length of the soft finger joint;
   $\theta_i$ is the bending angle of the soft finger joint, i=1, 2, 3, 4, 5; and $$\dfrac{\theta_i s}{I_h}$$

is the central angle corresponding to the segment (0~s) which derives the bending angle of the soft finger joint and determines the soft finger joint centroid velocity.

3. The consistency control method of a soft joint gripper based on 4D printing according to claim 2, wherein determining the finger bone centroid positions and the finger bone centroid velocities of any two finger bones according to the finger bone dynamic model under a global coordinate system specifically comprises:
   determining the finger bone centroid positions of any two finger bones according to the formula $$V_{l1} = \begin{bmatrix} x_{l1} \\ y_{l1} \end{bmatrix} = \begin{bmatrix} \varphi_1 + \left(\varphi_1 + \dfrac{I_l}{2}\right)\cos q_1 \\ \left(\varphi_1 + \dfrac{I_l}{2}\right)\sin q_1 \end{bmatrix}$$

and $$V_{l2} = \begin{bmatrix} x_{l2} \\ y_{l2} \end{bmatrix} = \begin{bmatrix} \varphi_1 + (\varphi_1 + I_l + \varphi_2)\cos q_1 + \left(\varphi_2 + \dfrac{I_l}{2}\right)\cos q_2 \\ (\varphi_1 + I_l + \varphi_2)\sin q_1 + \left(\varphi_2 + \dfrac{I_l}{2}\right)\sin q_2 \end{bmatrix};$$

where $V_{l1}$ is the finger bone centroid position of any finger bone; $V_{l2}$ is the finger bone centroid position of the finger bone adjacent to any finger bone;

$$\varphi_i = \left(r_i + \dfrac{T}{2}\right)\tan\dfrac{\theta_i}{2};$$

$$r_i = I_h \dfrac{\sin\theta_i}{\theta_i}$$

is the bending radius; T is the thickness of the soft finger joints; q$_1$ is the rotation angle of any finger bone; q$_2$ is the rotation angle of the adjacent finger bones; and deriving the rotation angle of the finger bone to determine the finger bone centroid velocity.

4. The consistency control method of a soft joint gripper based on 4D printing according to claim 3, wherein determining the dynamic model of bending angles of five soft finger units with respect to the soft finger joints according to the soft finger joint kinetic energy and the soft finger joint potential energy specifically comprises:

determining the dynamic model of bending angles of five soft finger units with respect to the soft finger joints according to the formula $$M(\theta_i)\ddot{\theta}_i + C(\theta_i, \dot{\theta}_i)\dot{\theta}_i + g(\theta_i) = \tau_i;$$

where $C(\theta_i, \dot{\theta}_i)\dot{\theta}_i$ is a symmetric inertia matrix; $M(\theta_i)\ddot{\theta}_i$ is Coriolis moment; $g(\theta_i)$ is a generalized powerful moment; $\tau_i$ is the dynamic model of bending angles of five soft finger units with respect to the soft finger joints, $\tau_i$ represents the input amount or control torque generated by each soft finger unit; $\dot{\theta}_i$ is the angular velocity of the bending angle of the soft finger joint; $\ddot{\theta}_i$ is the acceleration of the bending angle of the soft finger joint.

5. The consistency control method of a soft joint gripper based on 4D printing according to claim 4, wherein taking the dynamic model of bending angles of five soft finger units with respect to the soft finger joints as a control target to determine a consistency control protocol of a soft finger unit specifically comprises:

determining the consistency control protocol of the soft finger unit according to the formula $$\tau_i = -\sum_{j=1}^{n} a_{ij}(\theta_i - \theta_j) - \dot{\theta}_i;$$

where $a_{ij}$ is a number of an ith row and a jth column in a Laplace matrix corresponding to a location communication topological graph.

6. The consistency control method of a soft joint gripper based on 4D printing according to claim 1, wherein a bending sensor is attached to one of the surfaces for each of the double-layer film soft joint actuators.

7. The consistency control method of a soft joint gripper based on 4D printing according to claim 6, wherein determining the soft finger joint centroid positions and the soft finger joint centroid velocities of any two soft finger joints according to the soft finger joint dynamic model under a local coordinate system specifically comprises:

determining the soft finger joint centroid positions of any two soft finger joints according to the formula $$V_{hi}(s) = R_{(i-1)}\gamma_i(s) + V_{h(i-1)}(s);$$

where $V_{hi}(s)$ is the soft finger joint centroid position;

$$R_i = \begin{bmatrix} \cos\theta_i & -\sin\theta_i \\ \sin\theta_i & \cos\theta_i \end{bmatrix}$$

is the coordinate transformation matrix;

$$\gamma_i(s) = \begin{bmatrix} \dfrac{I_l}{2} + \dfrac{I_h}{\theta_i \sin(\theta_i s/I_h)} \\ \dfrac{I_h}{\theta_i(1 - \cos(\theta_i s/I_h))} \end{bmatrix}$$

$I_l$ is the length of the finger bone, and $I_h$ is the length of the soft finger joint;

$\theta_i$ is the bending angle of the soft finger joint, i=1, 2, 3, 4, 5;

$$\dfrac{\theta_i s}{I_h}$$

is the central angle corresponding to the segment (0~s) which derives the bending angle of the soft finger joint and determines the soft finger joint centroid velocity.

8. The consistency control method of a soft joint gripper based on 4D printing according to claim 7, wherein determining the finger bone centroid positions and the finger bone centroid velocities of any two finger bones according to the finger bone dynamic model under a global coordinate system specifically comprises:

determining the finger bone centroid positions of any two finger bones according to the formula $$V_{l1} = \begin{bmatrix} x_{l1} \\ y_{l1} \end{bmatrix} = \begin{bmatrix} \varphi_1 + \left(\varphi_1 + \dfrac{I_l}{2}\right)\cos q_1 \\ \left(\varphi_1 + \dfrac{I_l}{2}\right)\sin q_1 \end{bmatrix}$$

and $$V_{l2} = \begin{bmatrix} x_{l2} \\ y_{l2} \end{bmatrix} = \begin{bmatrix} \varphi_1 + (\varphi_1 + I_i + \varphi_2)\cos q_1 + \left(\varphi_2 + \dfrac{I_l}{2}\right)\cos q_2 \\ (\varphi_1 + I_i + \varphi_2)\sin q_1 + \left(\varphi_2 + \dfrac{I_l}{2}\right)\sin q_2 \end{bmatrix};$$

where $V_{l1}$ is the finger bone centroid position of any finger bone; $V_{l2}$ is the finger bone centroid position of the finger bone adjacent to any finger bone;

$$\varphi_i = \left(r_i + \dfrac{T}{2}\right)\tan\dfrac{\theta_i}{2};$$

$$r_i = I_h \dfrac{\sin\theta_i}{\theta_i}$$

is the bending radius; T is the thickness of the soft finger joints; q$_1$ is the rotation angle of any finger bone; q$_2$ is the rotation angle of the adjacent finger bones;

deriving the rotation angle of the finger bone to determine the finger bone centroid velocity.

9. The consistency control method of a soft joint gripper based on 4D printing according to claim 8, wherein determining the dynamic model of bending angles of five soft finger units with respect to the soft finger joints according to the soft finger joint kinetic energy and the soft finger joint potential energy specifically comprises:

determining the dynamic model of bending angles of five soft finger units with respect to the soft finger joints according to the formula $$M(\theta_i)\ddot{\theta}_i + C(\theta_i, \dot{\theta}_i)\dot{\theta}_i + g(\theta_i) = \tau_i;$$

where $C(\theta_i, \dot{\theta}_i))\dot{\theta}_i$ is a symmetric inertia matrix; $M(\theta_i)\ddot{\theta}_i$ is Coriolis moment; $g(\theta_i)$ is a generalized powerful moment; $\tau_i$ is the dynamic model of bending angles of five soft finger units with respect to the soft finger joints, $\tau_i$ represents the input amount or control torque generated by each soft finger unit; $\dot{\theta}_i$ is the angular velocity of the bending angle of the soft finger joint; $\ddot{\theta}_i$ is the acceleration of the bending angle of the soft finger joint.

10. The consistency control method of a soft joint gripper based on 4D printing according to claim 1, wherein the polyimide electrothermal film is used to adjust the temperature of the double-layer thin-film soft joint actuator; the polyimide electrothermal film generates Joule heat, the temperature rises, the liquid crystal elastomer shrinks, the polyimide electrothermal film expands, the contraction and expansion of different layers result in the bending of the soft finger joint; the double-layer thin-film soft finger joint actuator bends to the contraction side, and when the temperature drops and recovers to its original state, the reversible bending motion of the soft finger unit is controlled.

11. The consistency control method of a soft joint gripper based on 4D printing according to claim 10, wherein determining the soft finger joint centroid positions and the soft finger joint centroid velocities of any two soft finger joints according to the soft finger joint dynamic model under a local coordinate system specifically comprises:
determining the soft finger joint centroid positions of any two soft finger joints according to the formula $$V_{hi}(s)=R_{(i-1)}\gamma_i(s)+V_{h(i-1)}(s);$$

where $V_{hi}(s)$ is the soft finger joint centroid position;

$$R_i = \begin{bmatrix} \cos\theta_i & -\sin\theta_i \\ \sin\theta_i & \cos\theta_i \end{bmatrix}$$

is the coordinate transformation matrix;

$$\gamma_i(s) = \begin{bmatrix} \dfrac{I_l}{2} + \dfrac{I_h}{\theta_i \sin(\theta_i s/I_h)} \\ \dfrac{I_h}{\theta_i(1-\cos(\theta_i s/I_h))} \end{bmatrix}$$

$I_l$ is the length of the finger bone, and $I_h$ is the length of the soft finger joint;
$\theta_i$ is the bending angle of the soft finger joint, i=1, 2, 3, 4, 5;

$$\dfrac{\theta_i s}{I_h}$$

is the central angle corresponding to the segment (0~s) which derives the bending angle of the soft finger joint and determines the soft finger joint centroid velocity.

12. The consistency control method of a soft joint gripper based on 4D printing according to claim 11, wherein determining the finger bone centroid positions and the finger bone centroid velocities of any two finger bones according to the finger bone dynamic model under a global coordinate system specifically comprises:
determining the finger bone centroid positions of any two finger bones according to the formula $$V_{l1} = \begin{bmatrix} x_{l1} \\ y_{l1} \end{bmatrix} = \begin{bmatrix} \varphi_1 + \left(\varphi_1 + \dfrac{I_l}{2}\right)\cos q_1 \\ \left(\varphi_1 + \dfrac{I_l}{2}\right)\sin q_1 \end{bmatrix}$$

and $$V_{l2} = \begin{bmatrix} x_{l2} \\ y_{l2} \end{bmatrix} = \begin{bmatrix} \varphi_1 + (\varphi_1 + I_i + \varphi_2)\cos q_1 + \left(\varphi_2 + \dfrac{I_l}{2}\right)\cos q_2 \\ (\varphi_1 + I_i + \varphi_2)\sin q_1 + \left(\varphi_2 + \dfrac{I_l}{2}\right)\sin q_2 \end{bmatrix};$$

where $V_{l1}$ is the finger bone centroid position of any finger bone; $V_{l2}$ is the finger bone centroid position of the finger bone adjacent to any finger bone;

$$\varphi_i = \left(r_i + \dfrac{T}{2}\right)\tan\dfrac{\theta_i}{2};$$

$$r_i = I_h \dfrac{\sin\theta_i}{\theta_i}$$

is the bending radius; T is the thickness of the soft finger joints; $q_1$ is the rotation angle of any finger bone; $q_2$ is the rotation angle of the adjacent finger bones; and
deriving the rotation angle of the finger bone to determine the finger bone centroid velocity.

13. The consistency control method of a soft joint gripper based on 4D printing according to claim 12, wherein determining the dynamic model of bending angles of five soft finger units with respect to the soft finger joints according to the soft finger joint kinetic energy and the soft finger joint potential energy specifically comprises:
determining the dynamic model of bending angles of five soft finger units with respect to the soft finger joints according to the formula $$M(\theta_i)\ddot{\theta}_i+C(\theta_i, \dot{\theta}_i)\dot{\theta}_i+g(\theta_i)=\tau_i;$$

where $C(\theta_i, \dot{\theta}_i))\dot{\theta}_i$ is a symmetric inertia matrix; $M(\theta_i)\ddot{\theta}_i$ is Coriolis moment; $g(\theta_i)$ is a generalized powerful moment; $\tau_i$ is the dynamic model of bending angles of five soft finger units with respect to the soft finger joints, $\tau_i$ represents the input amount or control torque generated by each soft finger unit; $\dot{\theta}_i$ is the angular velocity of the bending angle of the soft finger joint; $\ddot{\theta}_i$ is the acceleration of the bending angle of the soft finger joint.

14. The consistency control method of a soft joint gripper based on 4D printing according to claim 1, wherein the bending angles of the double-layer film soft joint actuators are the same.

15. The consistency control method of a soft joint gripper based on 4D printing according to claim 14, wherein determining the soft finger joint centroid positions and the soft finger joint centroid velocities of any two soft finger joints according to the soft finger joint dynamic model under a local coordinate system specifically comprises:
determining the soft finger joint centroid positions of any two soft finger joints according to the formula $$V_{hi}(s)=R_{(i-1)}\gamma_i(s)+V_{h(i-1)}(s);$$

where $V_{hi}(s)$ is the soft finger joint centroid position;

$$R_i = \begin{bmatrix} \cos\theta_i & -\sin\theta_i \\ \sin\theta_i & \cos\theta_i \end{bmatrix}$$

is the coordinate transformation matrix;

$$\gamma_i(s) = \begin{bmatrix} \dfrac{I_l}{2} + \dfrac{I_h}{\theta_i \sin(\theta_i s / I_h)} \\ \dfrac{I_h}{\theta_i(1 - \cos(\theta_i s / I_h))} \end{bmatrix}$$

$I_l$ is the length of the finger bone, and $I_h$ is the length of the soft finger joint;

$\theta_i$ is the bending angle of the soft finger joint, i=1, 2, 3, 4, 5;

$$\dfrac{\theta_i s}{I_h}$$

is the central angle corresponding to the segment (0~s) which derives the bending angle of the soft finger joint and determines the soft finger joint centroid velocity.

16. The consistency control method of a soft joint gripper based on 4D printing according to claim 15, wherein determining the finger bone centroid positions and the finger bone centroid velocities of any two finger bones according to the finger bone dynamic model under a global coordinate system specifically comprises:

determining the finger bone centroid positions of any two finger bones according to the formula $$V_{l1} = \begin{bmatrix} x_{l1} \\ y_{l1} \end{bmatrix} = \begin{bmatrix} \varphi_1 + \left(\varphi_1 + \dfrac{I_l}{2}\right)\cos q_1 \\ \left(\varphi_1 + \dfrac{I_l}{2}\right)\sin q_1 \end{bmatrix}$$

and $$V_{l2} = \begin{bmatrix} x_{l2} \\ y_{l2} \end{bmatrix} = \begin{bmatrix} \varphi_1 + (\varphi_1 + I_i + \varphi_2)\cos q_1 + \left(\varphi_2 + \dfrac{I_l}{2}\right)\cos q_2 \\ (\varphi_1 + I_i + \varphi_2)\sin q_1 + \left(\varphi_2 + \dfrac{I_l}{2}\right)\sin q_2 \end{bmatrix};$$

where $V_{l1}$ is the finger bone centroid position of any finger bone; $V_{l2}$ is the finger bone centroid position of the finger bone adjacent to any finger bone;

$$\varphi_i = \left(r_i + \dfrac{T}{2}\right)\tan\dfrac{\theta_i}{2};$$

$$r_i = I_h \dfrac{\sin\theta_i}{\theta_i}$$

is the bending radius; T is the thickness of the soft finger joints; $q_1$ is the rotation angle of any finger bone; $q_2$ is the rotation angle of the adjacent finger bones; and deriving the rotation angle of the finger bone to determine the finger bone centroid velocity.

\* \* \* \* \*